(12) United States Patent
Ha

(10) Patent No.: US 9,612,396 B2
(45) Date of Patent: Apr. 4, 2017

(54) OPTICAL PRINTED CIRCUIT BOARD AND METHOD OF MANUFACTURING THE SAME

(71) Applicant: LG INNOTEK CO., LTD., Seoul (KR)

(72) Inventor: Sang Seon Ha, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 157 days.

(21) Appl. No.: 14/364,001

(22) PCT Filed: Nov. 29, 2012

(86) PCT No.: PCT/KR2012/010235
§ 371 (c)(1),
(2) Date: Jun. 9, 2014

(87) PCT Pub. No.: WO2013/085225
PCT Pub. Date: Jun. 13, 2013

(65) Prior Publication Data
US 2015/0003778 A1 Jan. 1, 2015

(30) Foreign Application Priority Data

Dec. 8, 2011 (KR) .................. 10-2011-0131362
Dec. 9, 2011 (KR) .................. 10-2011-0132354
Dec. 9, 2011 (KR) .................. 10-2011-0132355

(51) Int. Cl.
*G02B 6/12* (2006.01)
*G02B 6/13* (2006.01)
(Continued)

(52) U.S. Cl.
CPC .......... *G02B 6/12004* (2013.01); *B23K 26/38* (2013.01); *G02B 6/036* (2013.01);
(Continued)

(58) Field of Classification Search
None
See application file for complete search history.

(56) References Cited

U.S. PATENT DOCUMENTS 8,401,347 B2 * 3/2013 Matsushima ........ G02B 6/4214
385/14
8,693,815 B2 * 4/2014 Yamamoto ............... G02B 6/43
385/14
(Continued)

FOREIGN PATENT DOCUMENTS

JP 2000258664 A 9/2000
KR 10-2006-0118647 A 11/2006
(Continued)

OTHER PUBLICATIONS

International Search Report in International Application No. PCT/KR2012/010235, filed Nov. 29, 2012.
(Continued)

*Primary Examiner* — Michelle R Connelly
(74) *Attorney, Agent, or Firm* — Saliwanchik, Lloyd & Eisenschenk

(57) ABSTRACT

Provided is an optical printed circuit board, including: a first insulating layer on which at least one receiving groove with an inclined angle on at least one end is formed; an optical waveguide which is formed in the receiving groove of the first insulating layer; and a second insulating layer which is formed on the first insulating layer and buries the optical waveguide formed in the receiving groove.

12 Claims, 11 Drawing Sheets

(51) Int. Cl.
*G02B 6/42* (2006.01)
*G02B 6/132* (2006.01)
*B23K 26/38* (2014.01)
*G02B 6/036* (2006.01)

(52) U.S. Cl.
CPC .................. *G02B 6/12* (2013.01); *G02B 6/13* (2013.01); *G02B 6/132* (2013.01); *G02B 6/42* (2013.01); *G02B 6/4214* (2013.01); *G02B 2006/121* (2013.01); *G02B 2006/12104* (2013.01)

(56) References Cited

U.S. PATENT DOCUMENTS

2007/0137254 A1* 6/2007 Fukuzawa .............. G02B 6/125
                                                    65/386
2009/0190878 A1* 7/2009 Yanagisawa ......... G02B 6/4214
                                                    385/14
2010/0316330 A1   12/2010 Kim et al.
2011/0150405 A1*  6/2011 Shiraishi .......... B29D 11/00663
                                                    385/123

FOREIGN PATENT DOCUMENTS

| KR | 10-2007-0071454 A | 7/2007 |
| KR | 10-2009-0089668 A | 8/2009 |
| KR | 10-2010-0066155 A | 6/2010 |
| KR | 10-2010-0112731 A | 10/2010 |
| KR | 10-2010-0133767 A | 12/2010 |

OTHER PUBLICATIONS

Office Action dated Feb. 12, 2015 in Taiwanese Application No. 101145469.

* cited by examiner

100

Fig. 17
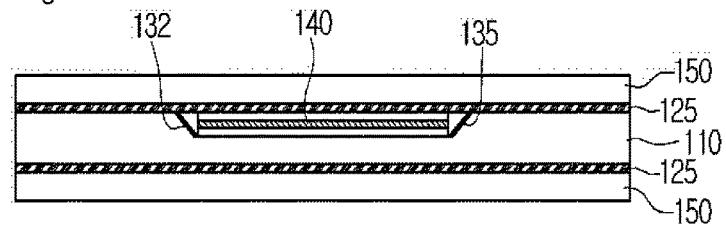
Fig. 18
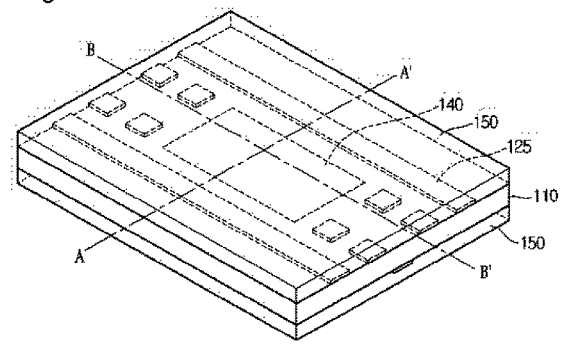
Fig. 19
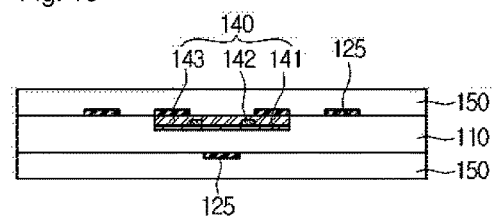
[Fig. 20]
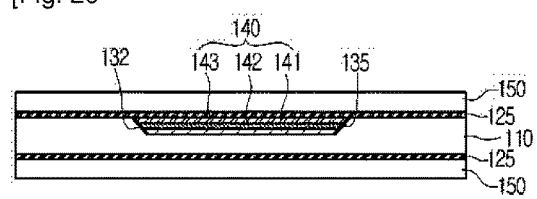
Fig. 21
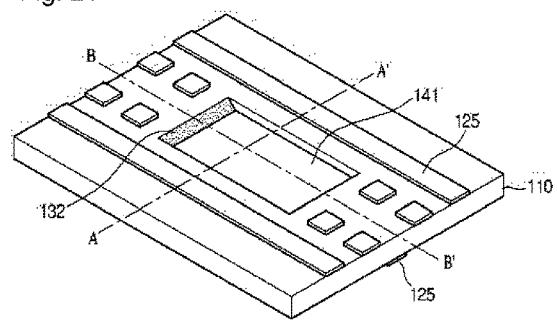
Fig. 22
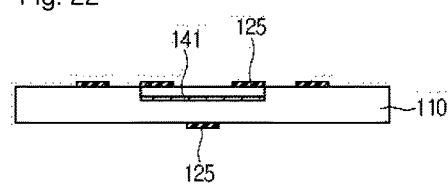

OPTICAL PRINTED CIRCUIT BOARD AND METHOD OF MANUFACTURING THE SAME

CROSS-REFERENCE TO RELATED APPLICATIONS

This application is the U.S. national stage application of International Patent Application No. PCT/KR2012/010235, filed Nov. 29, 2012, which claims priority to Korean Application Nos. 10-2011-0131362, filed Dec. 8, 2011; 10-2011-0132354, filed Dec. 9, 2011; and 10-2011-0132355, filed Dec. 9, 2011 the disclosures of each of which are incorporated herein by reference in their entirety.

TECHNICAL FIELD

This application claims priority to Korean Patent Application Nos. 10-2011-0131362, 10-2011-0132354 and 10-2011-0132355, filed on Dec. 8, 2011, Dec. 9, 2011, and Dec. 9, 2011, respectively, in the Korean Intellectual Property Office, the entire contents of which are hereby incorporated by reference.

The present invention relates to an optical printed circuit board and a method of manufacturing the same.

BACKGROUND ART

A generally used printed circuit board (PCB) is an electrical printed circuit board and is used by coating a substrate on which a copper thin circuit is formed, and inserting various kinds of component into the substrate to transmit electric signals. Since the conventional electrical printed circuit board has a low electric signal transmitting ability of the substrate compared to a components treating ability of the electric device, there was a problem in the transmission of transmit signals.

In particular, these electric signals are sensitive to outside circumstances and a noise phenomenon is generated. Thus, this becomes a large obstacle in electrical appliances which require high precision. Thus, to complement it, an optical printed circuit board using an optical waveguide instead of the electrical printed circuit board having the metallic circuit such as Cu has been developed, high precision and high-tech equipment, which is more stable to jamming, the noise phenomenon and the like, can be produced.

According to conventional arts, in the case of an optical printed circuit board, as disclosed in Prior Reference 1 (Publication No. 10-2011-0038522), an optical waveguide is produced by bending optical fiber at 90°, as disclosed in Prior Reference 2 (Publication No. 10-2010-0112731), the optical waveguide is produced by forming a mirror at an internal core layer, or as disclosed in Prior Reference 3 (Publication No. 10-2011-0038524), the optical printed circuit board is produced by manufacturing the printed circuit board and a light connecting module, separately, and inserting the separately manufactured light connecting module into the manufactured printed circuit board.

However, in Prior Reference 1, when optical printed circuit board is manufactured, the structure, in which the optical fiber is bent at 90° to connect the optical fiber with a signal transmitter TX and a signal receiver RX, is applied thereto, and during bending the optical fiber at 90°, optical loss is generated. Also, during a laminating process for burying layers in the printed circuit board, in a case where a step difference is present between the layers of the printed circuit board may occur and a bent region of the optical fiber, transmission loss is generated due to a high pressure.

Also, a total thickness of the optical module including the bent region increases a total thickness of the printed circuit board.

Also, in Prior Reference 2, it is problematic that it would be difficult to maintain an angle of a core exposed to the outside due to deformation (rolling or twisting) caused by heat, pressure and resin flow at laminating during the process for burying the layers in the printed circuit board.

Moreover, according to Prior Reference 3, due to a limitation in bend and a limitation in length and thickness of the manufactured optical waveguide, there is difficulty to overcome a limitation of the thin and small printed circuit board. Furthermore, as the printed circuit board and the optical connection module are manufactured separately, it is problematic that the process of manufacturing the optical circuit board is complex.

DISCLOSURE OF INVENTION

Technical Problem

An aspect of the present invention provides an optical printed circuit board having a new structure and a method of manufacturing the same.

Another aspect of the present invention provides an optical printed circuit board on which an optical waveguide is directly formed and processed, and a method of manufacturing the same.

The technical objects to be achieved by the present invention are not limited by the technical objects as described. Based on the following description, other technical objects which are not mentioned can be clearly understood by those having ordinary skill in the art to which the suggested exemplary embodiments pertain.

Solution to Problem

According to an aspect of the present invention, there is provided an optical printed circuit board, including: a first insulating layer on which at least one receiving groove with a inclined angle on at least one end is formed; an optical waveguide which is formed in the receiving groove of the first insulating; and a second insulating layer which is formed on the first insulating layer and buries the optical waveguide formed in the receiving groove.

According to another aspect of the present invention, there is provided an optical printed circuit board, including: a first insulating layer; an optical waveguide which is formed on the first insulating layer and includes an upper clad, a core and a lower clad; and a second insulating layer which is formed on the first insulating layer and buries the optical waveguide, wherein the upper clad is formed to surround a side of the core.

According to still another aspect of the present invention, there is provided a method of manufacturing an optical printed circuit board, including: preparing an insulating substrate having a circuit pattern formed on at least one surface thereof; forming a receiving groove having an inclined angle on at least one end by processing the insulating substrate; and forming an optical waveguide in the receiving groove.

According to still another aspect of the present invention, there is provided a method of manufacturing an optical printed circuit board, including: preparing an insulating substrate on which a circuit pattern is formed; forming a lower clad on the insulating substrate; forming a core on the lower clad; and forming an upper clad on the core to surround a side of the core.

Advantageous Effects of Invention

According to the present invention, since the receiving groove having an inclined angle is formed through a laser trench process or a precision and cutting process, a step difference caused by a thickness of the optical waveguide can be prevented, thereby enabling a laminating process of the printed circuit board to be easily performed. Furthermore, since a mirror and the optical waveguide are accurately arranged when the optical waveguide is buried, an optical loss property can be improved and the freedom of copper circuit designs can be also improved by burying the optical waveguide.

According to an exemplary embodiment of the present invention, because the optical waveguide is formed by printing or coating a liquid resin for the optical waveguide on the printed circuit board in which an inner layer is formed or bonding a sheet type material for the optical waveguide to the printed circuit board, it the freedom of wiring designs can be improved, the process of forming the receiving space for burying the optical waveguide can be shortened, and the precision of an array can be also improved.

BRIEF DESCRIPTION OF DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 4 through FIG. 17 are views for explaining a method of manufacturing the optical printed circuit board as illustrated in FIG. 1 through FIG. 3 in order of processes.

FIG. 18 is a perspective view of an optical printed circuit board according to a second exemplary embodiment of the present invention.

FIG. 19 is a cross-sectional view taken along A-A' of FIG. 18.

FIG. 20 is a cross-sectional view taken along B-B' of FIG. 18.

FIG. 21 through FIG. 31 are views for explaining a method of manufacturing the optical printed circuit board as illustrated in FIG. 18 through FIG. 20 in order of processes.

MODE FOR THE INVENTION

Hereinafter, preferred embodiments of the present invention will be described in detail with reference to the accompanying drawings in such a manner that the present could be easily implemented by those having ordinary skill in the art to which the present invent pertains. The present invention may, however, be embodied in different forms and should not be construed as limited to the embodiments set forth herein.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

According to one exemplary embodiment of the present invention, since a receiving groove having an inclined angle is formed through a laser trench process or a precision and cutting process and a optical waveguide is buried in the receiving groove 130, a step difference caused by a thickness of the optical waveguide can be prevented, thereby enabling a laminating process of the printed circuit board to be easily performed. Furthermore, since a mirror and the optical waveguide are accurately arranged when the optical waveguide is buried, an optical loss property can be improved and the freedom of copper circuit designs can be also improved by burying the optical waveguide.

In another exemplary embodiment of the present invention, because the optical waveguide is formed by printing or coating a liquid resin for the optical waveguide on the printed circuit board in which an inner layer is formed or bonding a sheet type material for the optical waveguide to the printed circuit board, the freedom of wiring designs can be improved, the process of forming the receiving space for burying the optical waveguide can be shortened, and the precision of an array can be improved.

Figure 1:
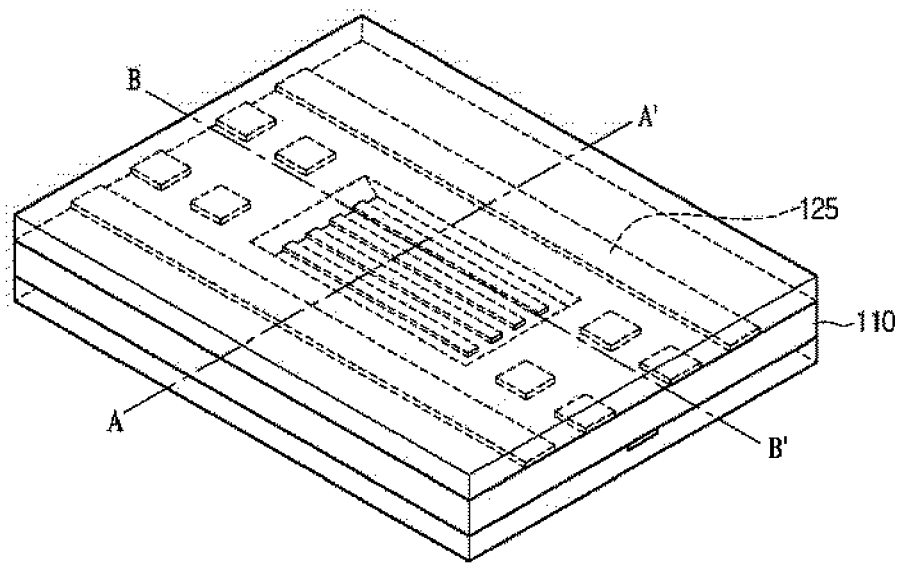
FIG. 1 is a perspective view of an optical printed circuit board according to a first exemplary embodiment of the present invention.
Figure 2:
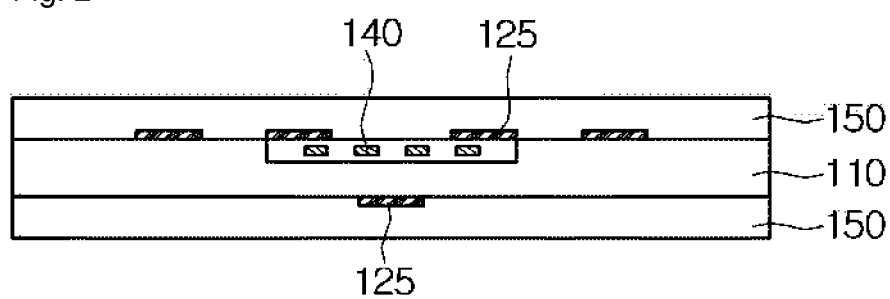
FIG. 2 is a cross-sectional view taken along A-A' of FIG. 1.

FIG. 1 is a perspective view of an optical printed circuit board according to a first exemplary embodiment of the present invention; FIG. 2 is a cross-sectional view taken along A-A' of FIG. 1; and FIG. 3 is a cross-sectional view taken along B-B' of FIG. 1.

Figure 3:
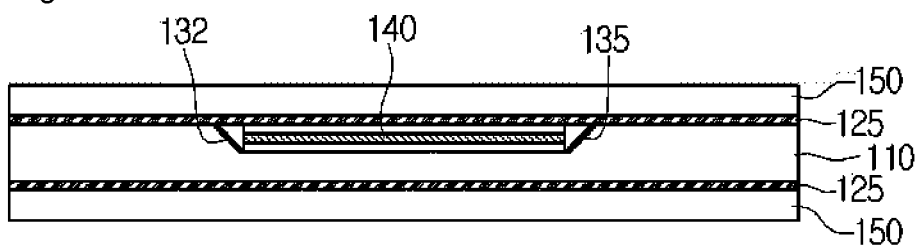
FIG. 3 is a cross-sectional view taken along B-B' of FIG. 1.

Referring to FIG. 1 through FIG. 3, an optical printed circuit board 100 includes: a first insulating layer 110; a circuit pattern 125 which is formed on at least one surface of the first insulating layer 110; an optical waveguide 140 which is formed in a receiving groove 130 with a constant inclined angle on both ends in the insulating layer 110; a first mirror which is formed at a first end of the receiving groove 130 and has an inclined angle corresponding to an inclined angle of the first end of the receiving groove 130; a second mirror 135 which is formed at a second end of the receiving groove 130 and has an inclined angle corresponding to an inclined angle of the second end of the receiving groove 130; and a second insulating layer 150 which is formed on an upper surface and a lower surface of the first insulating layer 110 and buries the circuit pattern 125 and the optical waveguide 140.

The first insulating layer 110 and the second insulating layer 150 perform the function of a basic member for provide durability to the optical printed circuit board.

The first and second insulating layers 110, 150 may be a support substrate of the optical printed circuit board in which a single circuit pattern is formed, or may mean an insulating layer area in which one circuit pattern 125 of the optical printed circuit board having a plurality of laminated structures is formed.

When the first insulating layer 110 and the second insulating layer 150 mean one insulating layer of the plurality of laminated structures, the plurality of circuit patterns may be sequentially formed at an upper part or a lower part of the first and second insulating layers 110, 150.

A conductive via (not drawn) is formed on the first insulating layer 110 so that the circuit patterns between different layers from each other are electrically connected to each other.

The circuit pattern 125 may be formed of an electrical conductive metal such as Au, Ag, Ni and Cu to transmit electrical signals, and preferably, may be formed using Cu.

The circuit pattern 125 may be formed by an additive process, a subtractive process, a modified semi additive process (MSAP), a semi additive process (SAP) and the like, which are the general processes of manufacturing the printed circuit board. Here, the detailed explanation thereon will be omitted.

The first insulating layer 110, and the second insulating layer 150 may be a thermosetting or thermoplastic polymer substrate, a ceramic substrate, an organic-inorganic composite material substrate or a glass fiber-impregnated substrate, and may include an epoxy-based insulating resin such as FR-4, BT (Bismaleimide Triazine), ABF (Ajinomoto Build up Film) and the like in the case where it include a polymer resin. Unlike this, the first insulating layer 110 and the second insulating layer 150 may include a polyimide-based resin. However, but the present invention is not specifically limited to this.

The receiving groove 130 (see FIG. 9) formed through a laser trench process or a precision and cutting process is formed in the first insulating layer 110. When the receiving groove 130 is formed by the laser process, a height of the receiving groove 130 may be easily adjusted. Thus, the height of the receiving groove 130 may be adjusted so that the integrated optical waveguide is completely buried in the receiving groove 130. Also, to be different from this, the height of the receiving groove 130 may be adjusted so that a part of the integrated optical waveguide is exposed onto the receiving groove 130. Since a light moves through a core 142, only a lower clad 141 and the core 142 are buried in the receiving groove 130. The upper clad 143 may be formed to protrude onto the receiving groove 130.

Both ends of the receiving groove 130 are formed to have a constant inclined angle. Preferably, the receiving groove 130 includes: a lower surface 130a; a left side surface 130b which is extend to have a constant inclined angle in an upper direction at one end of the lower surface 130a; and a right side surface 130c which is extend to have a constant inclined angle in an upper direction at another end of the lower surface 130a.

At this time, it would be preferable that an internal angle formed between the lower surface 130a and the left side surface 130b is formed in 135° so as to efficiently reflect optical signals. In other words, the left side surface 130b has an inclined angle of 135° at one end of the lower surface 130a and is formed to extend to the upper direction.

Also, an internal angle formed between the lower surface 130a and the right side surface 130c may be formed in 135° to efficiently reflect optical signals. In other words, the right side surface 130c is extended in the upper direction to have an inclined angle of 135° at another end of the lower surface 130a At this time, an inclined angle of the receiving groove 130 corresponds to that which is generated in the case in which the optical transmitter and the optical receiver are formed on the upper surface of the first insulating layer 110. That is, when the optical transmitter and the optical receiver are formed on the lower surface of the first insulating layer 110, an inclined angle of the receiving groove 130 may be formed to be different from the inclined angle as described above. For example, when the optical transmitter and the optical receiver are formed on the lower surface of the first insulating layer 110, the internal angle formed between the lower surface 130a and the left side surface 130b may be formed in 45°. Like this, the internal angle formed between the lower surface 130a and the right side surface 130c may be formed in 45°.

A first mirror 132 is formed at one end of the receiving groove 130, and a second mirror 135 is formed at another end of the receiving groove 130.

The first mirror 132 and the second mirror 135 are formed by laminating the metal layers including metal materials on both ends of the receiving groove 130. At this time, the first mirror 132 and the second mirror 135 may be formed of metal materials which can reflect light.

The first mirror 132 is formed in a position corresponding to a lower part of the optical transmitter (not drawn). At this time, the first mirror 132 is formed to have a predetermined inclined angle. The inclined angle provided with the first mirror 132 is identical with the inclined angle formed at one end of the receiving groove 130.

That is, the first mirror 132 is formed by laminating the metal materials at one end of the receiving groove 130 with the inclined angle using coating, laminating and spraying methods. Thus, the first mirror 132 is formed to have the inclined angle corresponding (identical) to the inclined angle provided with the receiving groove 130, itself.

The first mirror 132 receives the light generated from the optical transmitter (not drawn), and thus reflects the received light in a direction vertical to an incident direction.

The second mirror 135 is formed in a position corresponding to a lower part of the optical receiver (not drawn). At this time, the second mirror 135 is formed to have a predetermined inclined angle. The inclined angle provided with the second mirror 135 may be identical with the inclined angle formed at another end of the receiving groove 130.

That it, the second mirror 135 is formed by laminating the metal materials on another end of the receiving groove 130 having the inclined angle using coating, laminating and spraying methods. Thus, the second mirror 135 is formed to have the inclined angle corresponding to the inclined angle provided with the receiving groove 130, itself.

The second mirror 135 receives the light reflected through the first mirror 132, and thus reflects the received light in the direction vertical to the incident direction.

The optical waveguide 140 is buried in the receiving groove 130 on which the first mirror 132 and the second mirror 135 are formed.

Meanwhile, unlike this, by performing a sputtering process at one end and another end of the receiving groove 130 having the inclined angle, a metal reflection surface instead of the first mirror 132 and the second mirror may be formed.

The optical waveguide 140 includes the lower clad 141, the core 142, and the upper clad. At this time, the optical waveguide 140 is a single product in which the lower clad 141, the core 142 and the upper clad 143 are integrally produced. The optical waveguide 140 may be formed by inserting the optical waveguide formed in the single product into the receiving groove.

The lower clad 141 and the upper clad 143 are formed in a shape surrounding the core so that the transmission of light can be efficiently performed through the core.

The lower clad 141 and the upper clad 143 may be formed of polymer? based materials such as acryl, epoxy, polyimide, fluorinated acryl, or fluorinated polyimide.

The core 142 is interposed between the clad 143 and the lower clad 141 and performs the function of a path to which optical signals are transmitted. The core 142 is also formed of polymer-based materials which are similar to those of the upper clad 143 and the lower clad 141, and has a higher refractive index than the clad layers to efficiently transmit optical signals. At this time, the core 142 may be formed of $SiO_2$ in which a silica or a polymer is mixed.

That is, the optical waveguide 140 is a single product in which the lower clad 141, the upper clad 143, and the core 142 between the upper clad 143 and the lower clad 141 are integrally formed. The optical waveguide 140 may be formed by cutting the optical waveguide formed in the single product according to a size of the receiving groove 130.

The first mirror 132 and the second mirror 135 formed at one end and another end of the receiving groove 130, respectively, are located on a cutting surface of the core 142 included in the optical waveguide 140. As explained above, the first mirror 132 and the second mirror 135 are formed of materials having a high reflectivity such as aluminum or silver to efficiently transmit light.

At this time, the core 142 is disposed in the inner part of the upper clad 143 and the lower clad 141, and has a high refractive index compared to the upper clad 143 and the lower clad 141. Thus, the light passing through the core 142 is totally reflected at a boundary surface between the core 142, and the upper and lower clads 141, 143, thereby proceeding along the core 142.

At this time, since the light moves through the core 142, the core 142 may be disposed in the receiving groove 130 on which the first mirror 132 and the second mirror 135 are formed, and the upper clad 143 may be formed to protrude to the above of the receiving groove 130.

Meanwhile, the optical waveguide 140 may be formed of polymer materials having excellent light transmission and flexibility, for example, organic-inorganic materials and the like using an embossing process or a photolithography process.

At this time, the organic-inorganic polymer material may be composed of any one of, for example, low density polyethylene, ultra low density polyethylene (LLDPE), high density polyethylene, polypropylene, amide-based nylon 6, nylon 66, nylon 6/9, nylon 6/10, nylon 6/12, nylon 11, nylon 12, polystyrene, polyethylene terephthalate, polybutyl terephthalate, polyvinyl choloride, polyvinylidene chloride, polycarbonate, and cellulose acetate or poly(meth)acrylate. Also, the organic-inorganic polymer material may be composed of any one selected among these materials or a combination thereof in consideration of a thermal property and a mechanical property.

Meanwhile, in the receiving groove 130, the side of the optical waveguide 140 (i.e. the side of the upper clad 143, the side of the lower clad 141 and the side of the core 142) is exposed. Also, as illustrated in the drawing, the optical waveguide 140 may be formed in a shape in which the upper surface and the side form a right angle. However, according to the exemplary embodiment, the optical waveguide 140 may have an inclined angle corresponding to the inclined angle provided with the receiving groove 130. For this, when the optical waveguide 140 produced in the single product is cut, in consideration of the size of the receiving groove 130 and the inclined angle provided with the receiving groove 130, the cutting process should be carried out.

The optical transmitter (not drawn) is formed in an upper position of the first mirror 132, and the optical receiver (not drawn) is formed in an upper position of the second mirror 134. Preferably, the optical transmitter is connected to the circuit pattern located at the upper part of the first mirror 132, and the optical receiver is connected to the circuit pattern 125 located at the upper part of the second mirror 135. The optical transmitter generates and outputs optical signals, and includes a driver integrated circuit (not drawn) and a light emitting device (not drawn). The light emitting device is driven by the driver integrated circuit and generates light in a direction to which the first mirror 132 is formed.

At this time, the light emitting device may include a vertical-cavity surface-emitting laser (VCSEL) which is a light source device for irradiating optical signals. The VCSEL is a light source device which transmits or amplifies the optical signals using a method of irradiating a laser beam vertically.

The optical receiver includes a receiver integrated circuit (not drawn) and a light receiving device (not drawn).

The light receiving device receives the light generated from the light transmitter, and is driven by the receiver integrated circuit. The light receiving device may include a photo detector (PD) which is a device for detecting optical signals.

Also, as illustrated in the drawing, the optical printed circuit board 100 includes a multi channel light waveguide in which the optical waveguide 140 is formed in plural number within the same layer. As well as the multi channels, the optical printed circuit board, in which the optical waveguide 140 is formed in plural number and a multilayered shape, may be also manufactured. The number of the optical waveguide 140 (preferably, the number of the core 142) may further increase and reduce according to exemplary embodiments.

As described above, in the optical printed circuit board 100 according to the present exemplary embodiment of the present invention, since the receiving groove having an inclined angle is formed through the laser trench process or a precision and cutting process, and the optical waveguide 140 of the single product is formed in the receiving groove 130, a step difference caused by a thickness of the optical waveguide can be prevented, thereby enabling a laminating process of the printed circuit board to be easily performed. Furthermore, since the mirrors 132, 135 and the optical waveguide 140 are accurately arranged when the optical waveguide 140 is buried, an optical loss property can be improved and the freedom of copper circuit designs can be also improved by burying the optical waveguide.

Hereinafter, a method of manufacturing the printed circuit board 100 as illustrated in FIG. 1 through FIG. 3 will be explained with reference to the attached drawings.

Figure 4:
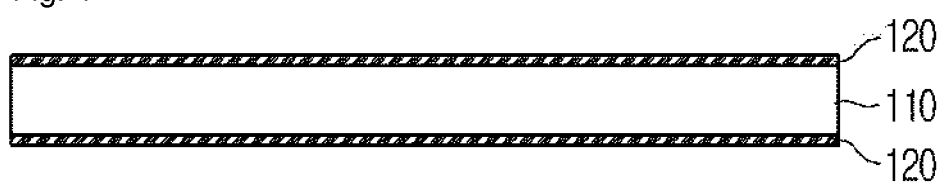

FIG. 4 though FIG. 17 are views for explaining a method of manufacturing the optical printed circuit board as illustrated in FIG. 1 through FIG. 3 in order of processes.

Referring to FIG. 4, the insulating substrate 110 (i.e. an insulating layer) is first prepared. At this time, when the insulating substrate 110 is an insulating layer on which a conductive layer 120 of is laminated, a laminated structure of the insulating layer and the conductive layer 120 may be a normal copper clad laminate (CCL).

Unlike this, the conductive layer 120 may be a plated layer formed by electroless plating the insulating layer 110. At this time, when the conductive layer is formed by electroless plating, roughness is provided onto the upper surface and the lower surface of the insulating layer 110 so that plating may be smoothly performed.

Figure 5:
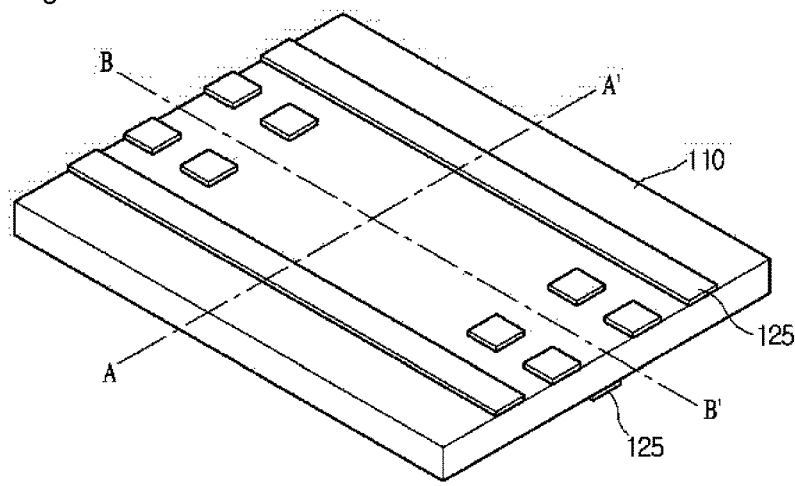
Figure 6:
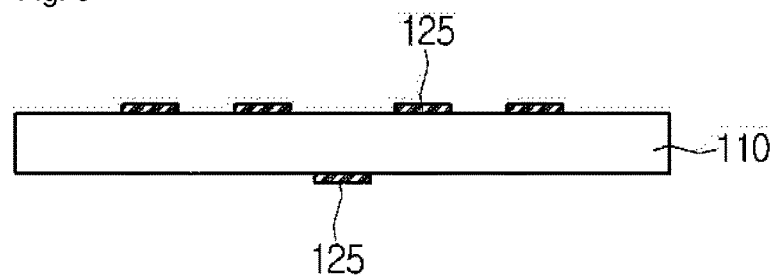

Next, as illustrated in FIG. 5 and FIG. 6, a circuit pattern 125 is formed by etching the conductive layer formed on the upper surface and the lower surface of the insulating layer 110. FIG. 6 is a cross-sectional view taken along A-A' of FIG. 5.

The circuit pattern 125 may be formed to correspond to a position where the optical transmitter or the optical receiver will be mounted later.

The circuit pattern 125 may be formed in the order of a dry film laminating process, an exposure process, a development process, an etching process and a peeling process.

Figure 7:
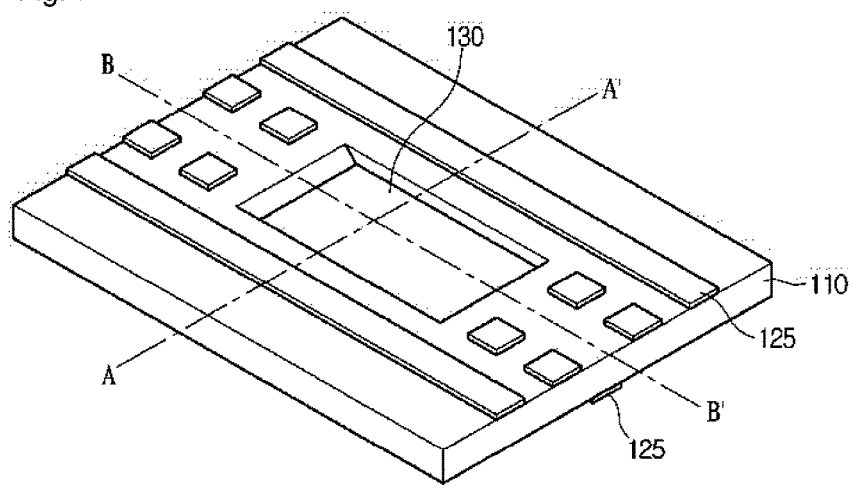
Figure 8:
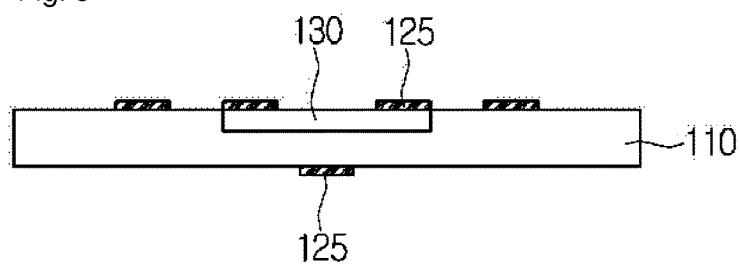
Figure 9:
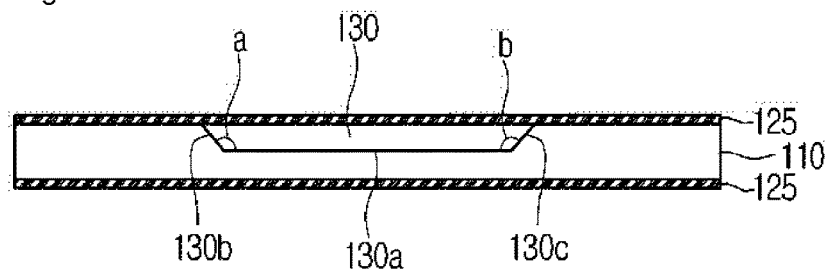

Next, as illustrated in FIG. 7, FIG. 8 and FIG. 9, on the insulating layer 110, the receiving groove 130 is formed by performing a laser trench process or a precision and cutting process. FIG. 8 is a cross-sectional view taken along A-A' of FIG. 7. FIG. 9 is a cross-sectional view taken along B-B' of FIG. 7.

The receiving groove 130 provides a mounting space for mounting the optical waveguide 140 in the insulating layer 110.

The receiving groove 130 is formed so that at least one end thereof has a predetermined inclined angle. At this time, the inclined angle may be formed at only one end of the receiving groove 130. Unlike this, the inclined angle may be formed at one end and another end opposite to the one end.

That is, to enable optical transmission and reception to be performed within the optical printed circuit board 100, the respective inclined angles should be formed at one end and another end of the receiving groove 130. When the printed circuit board 100 is manufactured with the object of receiving optical signal transmitted from external apparatuses or transmitting optical signals to external apparatuses, the inclined angle may be formed at only one end of the receiving groove 130.

The inclined angle may be formed in 45° to efficiently reflect optical signals in a vertical direction to an incident direction of the optical signals.

More specifically, as illustrated in FIG. 9, the receiving groove 130 includes: the lower surface 130a; the left side surface 130b which is extend to have a constant inclined angle in the upper direction at one end of the lower surface 130a; and the right side surface 130c which is extend to have a constant inclined angle in the upper direction at another end of the lower surface 130a.

At this time, the internal angle formed between the lower surface 130a and the left side surface 130b may be formed in 135° so as to efficiently reflect the optical signals. In other words, the left side surface 130b has an inclined angle of 135° at one end of the lower surface 130a and is extended in the upper direction.

Also, the internal angle formed between the lower surface 130a and the right side surface 130c may be formed in 135° to efficiently reflect the optical signals. In other words, the right side surface 130c is extended in the upper direction while having an inclined angle of 135° at another end of the lower surface 130a.

Meanwhile, the inclined angle of the receiving groove 130 corresponds to that generated in the case in which the optical transmitter and the optical receiver are formed on the upper surface of the first insulating layer 110. That is, when the optical transmitter and the optical receiver are formed on the lower surface of the first insulating layer 110, the inclined angle of the receiving groove 130 may be formed to be different from the inclined angle as above. For example, when the optical transmitter and the optical receiver are formed on the lower surface of the first insulating layer 110, an internal angle formed between the lower 130a and the left side surface 130b may be formed in 45°. Like this, an internal angle formed between the lower surface 130a and the right side surface 130c may be formed in 45°.

In the present exemplary embodiment of the invention, to form a reflection member which changes the path of optical signals in the receiving groove 130 itself for forming the optical waveguide, both ends of the receiving groove 130 are formed to have a constant inclined angle so as to correspond to an installation angle of the reflection member.

Figure 10:
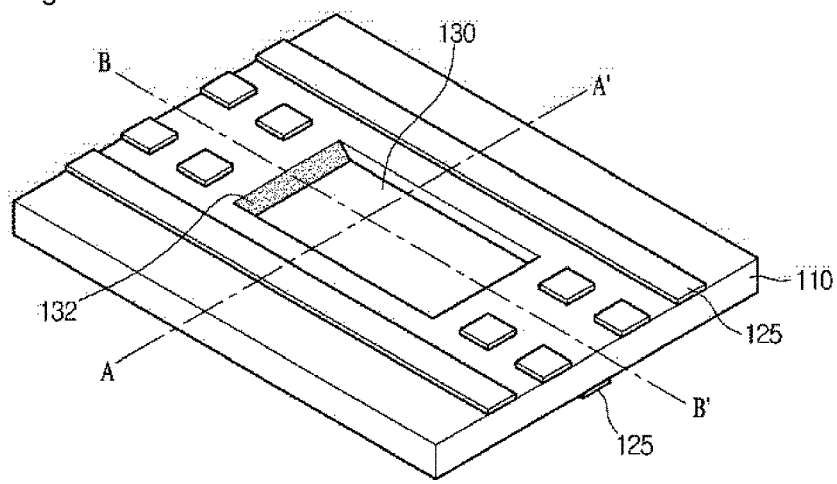
Figure 11:
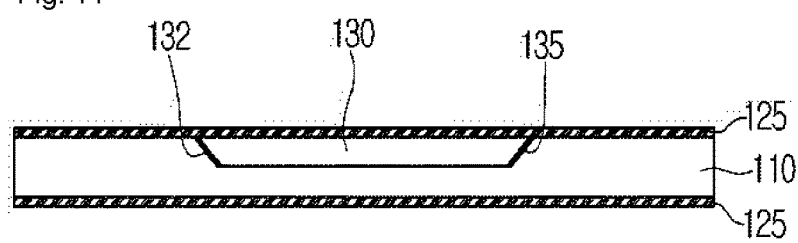

Next, as illustrated in FIG. 10 and FIG. 11, the first mirror 132 and the second mirror 135 are formed at both ends of the receiving groove 130. FIG. 11 is a cross-sectional view taken along B-B' of FIG. 10.

The first mirror 132 and the second mirror 135 may be formed by forming the metal layer on the left side surface 130b and the right side surface 130c of the receiving groove 130 using coating, laminating and spraying methods.

The first mirror 132 and the second mirror 135 are formed on the left side surface 130b and the right side surface 130c so as to have each inclined angle corresponding to the inclined angles provided with the left side surface 130b and the right side surface 130c.

In other words, the first mirror 132 has an inclined angle corresponding (preferably, identical) to the inclined angle (i.e. 135° based on the lower surface 130a) provide with the left side surface. Also, the second mirror 135 has an inclined angle corresponding (preferably, identical) to the inclined angle (i.e. 135° based on the lower surface 130a) provided with the right side surface 130b.

Figure 12:
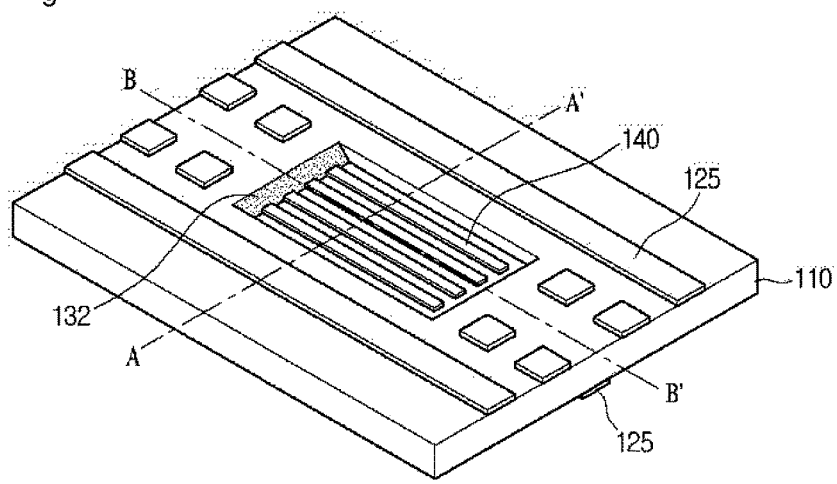
Figure 13:
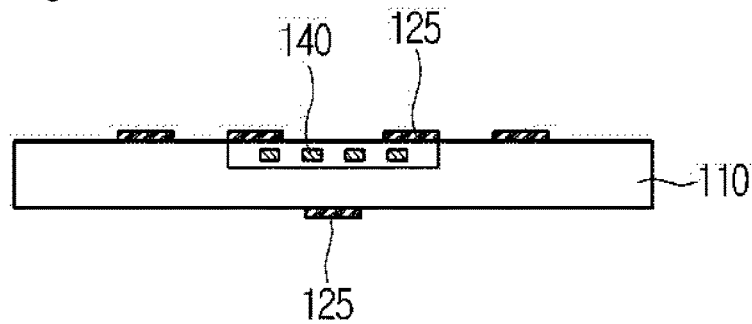
Figure 14:
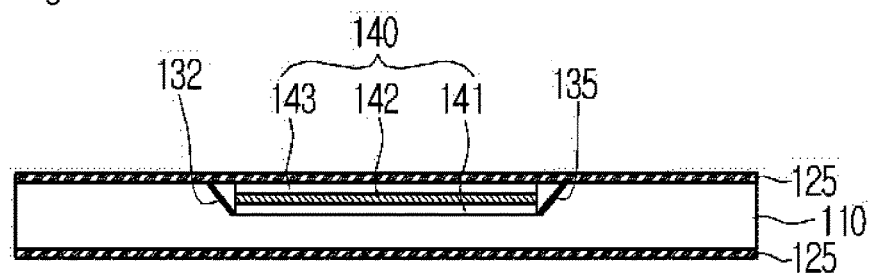

Next, as illustrated in FIG. 12, FIG. 13 and FIG. 14, the optical waveguide 140 is formed in the receiving groove 130. FIG. 13 is a cross-sectional view taken along A-A' of FIG. 12, and FIG. 14 is a cross-sectional view taken along B-B' of FIG. 12.

At this time, the optical waveguide 140 includes the lower clad 141, the core 142, and the upper clad 143.

Also, the optical waveguide 140 is a single product in which the lower clad 141, the core 142 and the upper clad 143 are integrally produced. By inserting the optical waveguide formed in the single product into the receiving groove 130, the optical waveguide 140 may be formed in the receiving groove 130 as illustrated in FIGS. 12, 13 and 14.

The lower clad 141 and the upper clad 143 are formed in a shape surrounding the core so that the transmission of light can be efficiently performed through the core. The lower clad 141 and the upper clad 143 may be formed of polymer? based materials such as acryl, epoxy, polyimide, fluorinated acryl, or fluorinated polyimide.

The core 142 is interposed between the clad 143 and the lower clad 141 and performs the function of a path to which optical signals are transmitted. The core 142 is also formed of polymer-based materials which are similar to those of the upper clad 143 and the lower clad 141, and has a higher refractive index than the clad layers to efficiently transmit optical signals. At this time, the core 142 may be formed of SiO2 in which a silica or a polymer is mixed.

That is, the optical waveguide 140 is a single product in which the lower clad 141, the upper clad 143, and the core 142 between the upper clad 143 and the lower clad 141 are integrally formed. The optical waveguide 140 may be formed by cutting the optical waveguide formed in the single product according to a size of the receiving groove 130.

The first mirror 132 and the second mirror 135 formed at one end and another end of the receiving groove 130 are located on a cutting surface of the core 142 included in the optical waveguide 140. As explained above, the first mirror 132 and the second mirror 135 are formed of materials having a high reflectivity such as aluminum or silver to efficiently transmit light.

At this time, the core 142 is disposed in the inner part of the upper clad 143 and the lower clad 141, and has a high refractive index compared to the upper clad 143 and the lower clad 141. Thus, the light passing through the core 142 is totally reflected at a boundary surface between the core 142, and the upper and lower clads 141, 143, thereby proceeding along the core 142.

At this time, since the light moves through the core 142, the core 142 may be disposed in the receiving groove 130 on which the first mirror 132 and the second mirror 135 are formed, and the upper clad 143 may be formed to protrude to the above of the receiving groove 130.

Meanwhile, the optical waveguide 140 may be formed of polymer materials having excellent light transmission and flexibility, for example, organic-inorganic materials and the like using an embossing process or a photolithography process.

Meanwhile, in the receiving groove 130, the side of the optical waveguide 140 (i.e. the side of the upper clad 143, the side of the lower clad 141 and the side of the core 142) is exposed. Also, as illustrated in the drawing, the optical waveguide 140 may be formed in a shape in which the upper surface and the side form a right angle. However, according to the exemplary embodiment, the optical waveguide 140 may have an inclined angle corresponding to the inclined angle provided with the receiving groove 130. For this, when the optical waveguide 140 produced in the single product is cut, in consideration of the size of the receiving groove 130 and the inclined angle provided with the receiving groove 130, the cutting process is carried out, and the cut optical waveguide 140 is inserted into the receiving groove 130.

Also, since the optical waveguide is inserted into the receiving groove 130 after being cut as above, each side of the lower clad 141, the core 142 and the upper clad 143 is exposed to the first mirror 132 and the second mirror 135 formed in the receiving groove 130.

Figure 15:
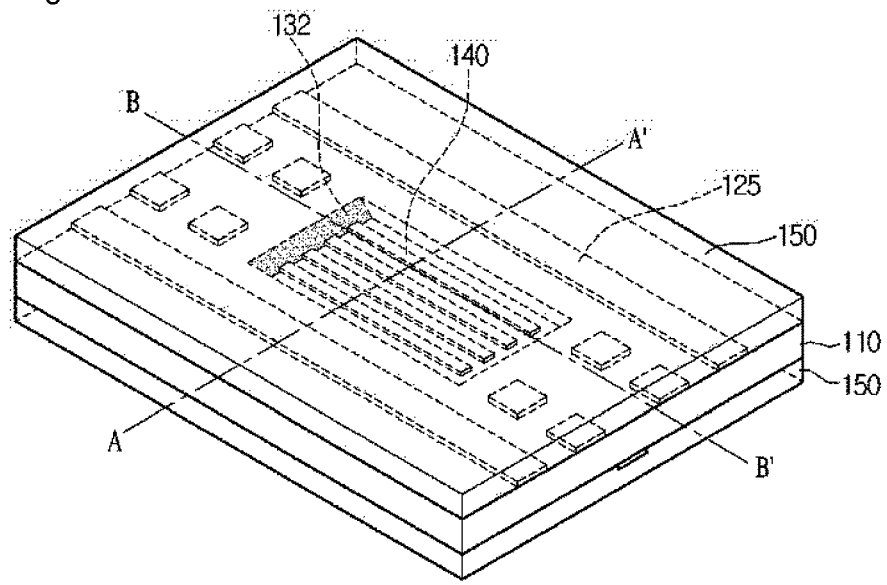
Figure 16:
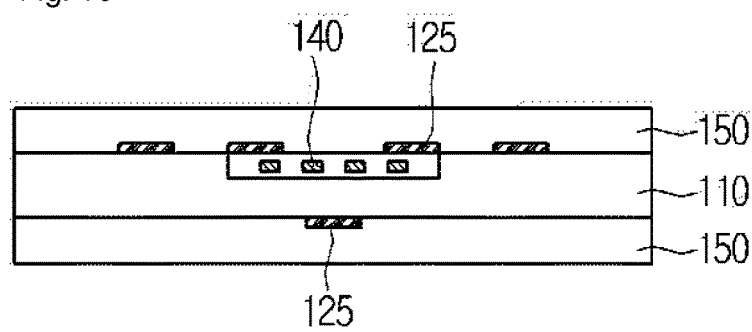

Then, as illustrated in FIG. 15, FIG. 16 and FIG. 17, the second insulating layer 150 for burying the optical waveguide 140 and the circuit pattern 125 is formed on the upper surface and the lower surface of the insulating layer 110 on which the optical waveguide 140 is formed as above. FIG. 16 is a cross-sectional view taken along A-A' of FIG. 15. FIG. 17 is a cross-sectional view taken along B-B' of FIG.

Prior to this, the optical transmitter (not drawn) may be formed in an upper position of the first mirror 132, and the optical receiver (not drawn) may be formed in an upper position of the second mirror 134. More preferably, the optical transmitter is formed on the circuit pattern located at the upper part of the first mirror 132, and the optical receiver is formed on the circuit pattern 125 located at the upper part of the second mirror 135.

FIG. 18 is a perspective view of an optical printed circuit board according to a second exemplary embodiment of the present invention; FIG. 19 is a cross-sectional view taken along A-A' of FIG. 18; and FIG. 20 is a cross-sectional view taken along B-B' of FIG. 18. Hereinafter, in view of a difference between the optical printed circuit boards according to the first exemplary embodiment and the second exemplary embodiment, the second exemplary embodiment will be explained.

Referring to FIG. 18 through 20, the optical printed circuit board according to the second exemplary embodiment is similar to the optical printed circuit board 100 as illustrated in FIG. 1 through FIG. 3, but there is a difference between them these exemplary embodiments with respect to the optical waveguide 140. That is, to be identical with the optical waveguide according the first exemplary embodiment, the optical waveguide 140 according to the second exemplary embodiment includes the lower clad 141, the core 142, and the upper clad 143. However, the optical waveguide 140 is formed in the receiving groove 130 by sequentially laminating the lower clad 141, the core 142 and the upper clad.

The lower clad 141 is preferentially formed in the receiving groove 130, the core 142 is formed in the lower clad 141, and the upper clad for burying the receiving groove is then formed on the core 142.

The lower clad 141 and the upper clad 143 are formed in the shape surrounding the core so that the transmission of light can be efficiently performed through the core.

The first mirror 132 and the second mirror 135 formed at one end and another end of the receiving groove 130 are located on the side of the core 142 included in the optical waveguide 140. As explained with reference to FIG. 1 through FIG. 3, the first mirror 132 and the second mirror 135 are formed of materials having high reflectivity such as aluminum or silver to efficiently transmit light.

Also, the optical waveguide 140 may have an inclined angle corresponding to the inclined angle provided with the receiving groove 130, and may be formed by burying the inner part of the receiving groove 130.

Unlike this, only the side of the upper clad 143 included in the optical waveguide 140 may be exposed in the receiving groove 130. To be different from this, each side of the upper clad 143 and the lower clad 141 may be exposed in the receiving groove 130.

The optical transmitter (not drawn) is formed in an upper position of the first mirror 132, and the optical receiver (not drawn) is formed in an upper position of the second mirror 134. Preferably, the optical transmitter is connected to the circuit pattern 125 located at the upper part of the first mirror 132, and the optical receiver is connected to the circuit pattern 125 located at the upper part of the second mirror 135. Along with the optical waveguide 140, the optical transmitter and the optical receiver are buried in the second insulating layer 150.

In the optical printed circuit board 100 according to a second exemplary embodiment of the present invention, since the receiving groove having an inclined angle is formed through a laser trench process or a precision and cutting process, and the optical waveguide is formed by sequentially laminating the lower clad 141, the core 142 and the upper clad 142 in the receiving groove 130, a step difference caused by a thickness of the optical waveguide can be prevented, thereby enabling a laminating process of the printed circuit board to be easily performed. Furthermore, since a mirror and the optical waveguide are accurately arranged when the optical waveguide is formed, an optical loss property can be improved and the freedom of copper circuit designs can be also improved by burying the optical waveguide. Hereinafter, referring to the attached drawings, a method of manufacturing the optical printed circuit board as illustrated in FIG. 18 through FIG. 20 will be explained.

FIG. 21 through FIG. 31 are views for explaining a method of manufacturing the optical printed circuit board 100 as illustrated in FIG. 18 through FIG. 20 in order of processes. An explanation on the processes repeated with the processes as illustrated in FIG. 4 through FIG. 17 will be omitted.

As explained in FIG. 4 through FIG. 11, the insulating substrate 110 (i.e. the insulating layer) is first prepared, the circuit pattern 125 is formed by etching the conductive layer 120 formed on the upper surface and the lower surface of the insulating layer 110, the receiving groove 130 is formed by performing a laser trench process or a precision and cutting process on the insulating layer 110, and thereafter the first mirror 132 and the second mirror 135 are formed at both ends of the receiving groove 130.

Figure 23:
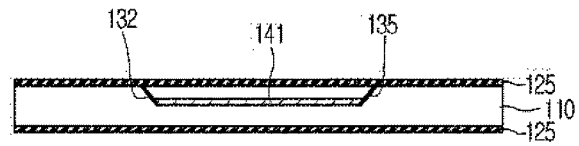

Next, as illustrated in FIG. 21, FIG. 22 and FIG. 23, the lower clad 141 is formed in the receiving groove 130. FIG. 22 is a cross-sectional view taken along A-A' of FIG. 21, and FIG. 23 is a cross-sectional view taken along B-B' of FIG. 21.

The lower clad 141 is composed of polymer? based materials such as acryl, epoxy, polyimide, fluorinated acryl, or fluorinated polyimide so that optical transmission can be efficiently performed.

Figure 24:
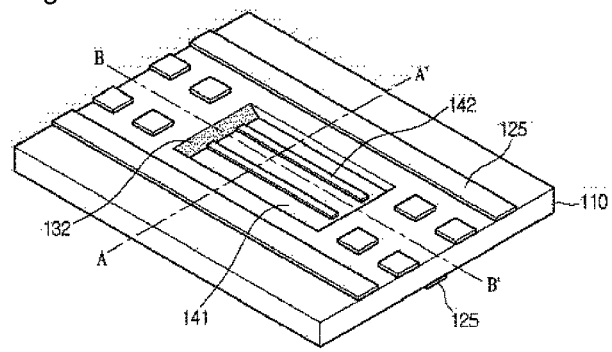
Figure 25:
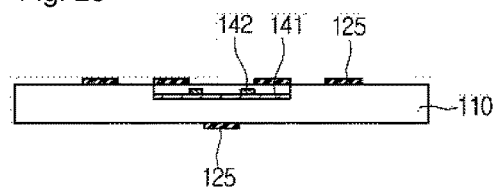
Figure 26:
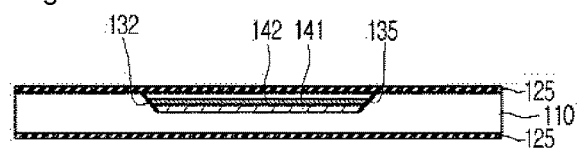

Next, as illustrated in FIG. 24, FIG. 25 and FIG. 26, the core 142 is formed on the lower clad 141. FIG. 25 is a cross-sectional view taken along A-A' of FIG. 24; and FIG. 26 is a cross-sectional view taken along B-B' of FIG. 24.

The core is formed on the lower clad 141 and performs the function of a path to which optical signals are transmitted. The core 142 is also formed of polymer-based materials which are similar to those of the upper clad 143 and the lower clad 141, and has a higher refractive index than the clad layers to efficiently transmit optical signals. At this time, the core 142 may be formed of $SiO_2$ in which a silica or a polymer is mixed.

Figure 27:
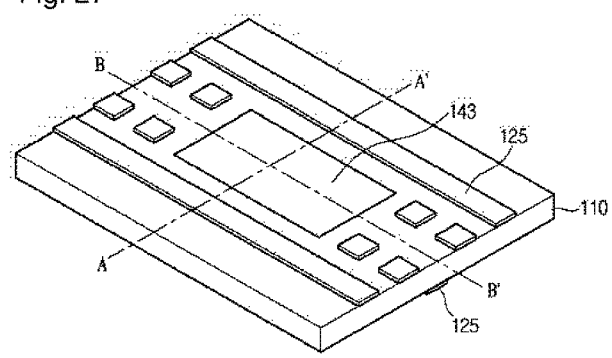
Figure 28:
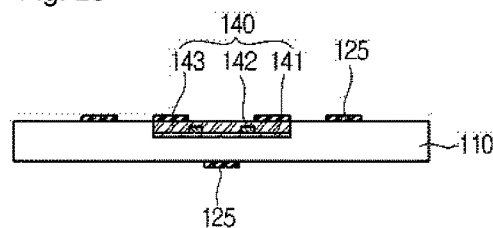
Figure 29:
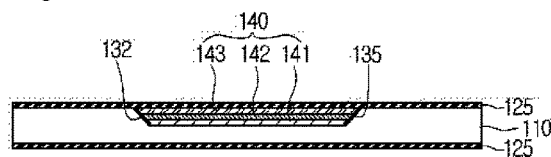

Next, as illustrated in FIG. 27, FIG. 28 and FIG. 29, the upper clad 143 for burying the receiving groove is formed on the core 142.

The upper clad 144 is composed of polymer? based materials such as acryl, epoxy, polyimide, fluorinated acryl, or fluorinated polyimide so that optical transmission may be efficiently performed through the core 142.

Thus, the first mirror 132 and the second mirror 135 formed at one end and another end of the receiving groove 130 are located on the side of the core 142 included in the optical waveguide 140. As explained above, the first mirror 132 and the second mirror 135 are formed of a material having a high reflectivity such as aluminum or silver so that optical transmission may be efficiently performed.

Meanwhile, in the receiving groove 130, the side of the optical waveguide 140 (i.e. the side of the upper clad 143, the side of the lower clad 141, and the side of the core 142) is exposed.

Also, since the side of the upper clad 143, the side of the lower clad 141, and the side of the core 142 are formed to bury the inner part of the receiving groove 130, the side of the upper clad 143, the side of the lower clad 141, and the side of the core 142 may be formed to have the inclined angle correspond to the inclined angle formed at both ends of the receiving groove 130.

According to still another exemplary embodiment, in the receiving groove 130, only the side of the upper clad 143 may be exposed according to a method of forming the upper clad 143, the lower clad 141 and the core 142.

Thus, only the side of the upper clad 143 may have the inclined angle corresponding to the inclined angle formed at both ends of the receiving groove 130.

Figure 30:
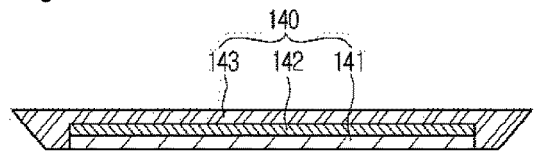

That is, as illustrated in FIG. 30, the core 142 to which the upper surface of the lower clad 141 is exposed is formed on the lower clad 141. Thus, the side and the upper surface of the lower clad 141, and the upper clad 142 for burying the inner part of the receiving groove 130 while surrounding the side and the upper of the core 142 may be formed.

According to still another exemplary embodiment, in the receiving groove 130, only the side of the upper clad 143 and the side of the lower clad 141 may be exposed according to a method of forming the upper clad 143, the lower clad 141 and the core 142. Thus, the side of the upper clad 143 and the side of the lower clad 141 may have the inclined angle corresponding to the inclined angle formed at both ends of the receiving groove 130.

Figure 31:
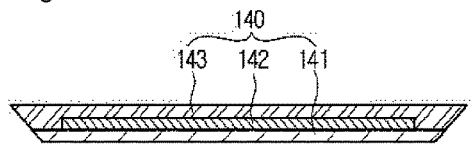

That is, as illustrated in FIG. 31, the core 142 to which the upper surface of the lower clad 141 is exposed is formed on the lower clad 141. Thus, the side and the upper surface of the lower clad 141, and the upper clad 142 for burying the inner part of the receiving groove 130 while surrounding the side and the upper of the core 142 may be formed.

According to FIG. 30 and FIG. 31, since the upper clad 143 and the lower clad 141 surround the side of the core 142, an exposed surface of the core 142 reduces, thereby protecting the core 142 from external factors.

Then, as explained in FIG. 15 through FIG. 17, the second insulating layer 150 for the optical waveguide 140 and the circuit pattern 125 is formed on the upper surface and the lower surface of the insulating layer 110 on which the optical waveguide 140 is formed.

According to the second exemplary embodiment of the present invention, since the receiving groove having an inclined angle is formed through the laser trench process or a precision and cutting process, a step difference caused by a thickness of the optical waveguide can be prevented, thereby enabling the laminating process of the printed circuit board to be easily performed. Furthermore, since a mirror and the optical waveguide are accurately arranged when the optical waveguide is buried, an optical loss property can be improved and the freedom of copper circuit designs can be also improved by burying the optical waveguide.

Figure 32:
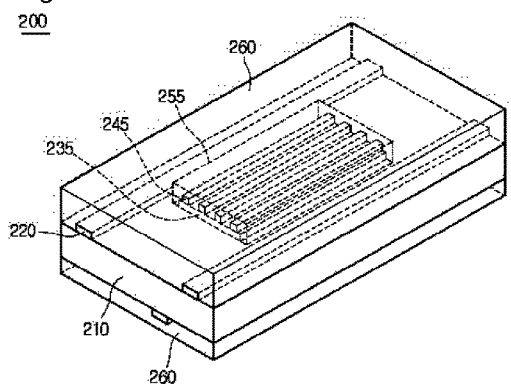
FIG. 32 is a perspective view of an optical printed circuit board according to a third exemplary embodiment of the present invention.
Figure 33:
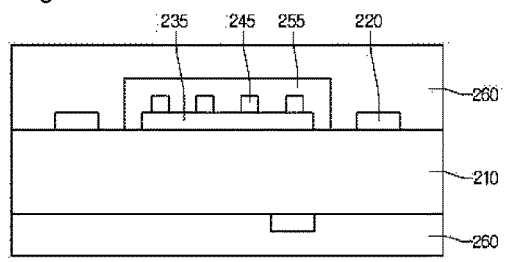
FIG. 33 is a cross-sectional view of the optical printed circuit board as illustrated in FIG. 32.

FIG. 32 is a perspective view of an optical printed circuit board according to a third exemplary embodiment of the present invention; and FIG. 33 is a cross-sectional view of the optical printed circuit board as illustrated in FIG. 32.

Referring to FIG. 32 and FIG. 33, a printed circuit board 200 according to the third exemplary embodiment of the present invention includes: a first insulating layer 210; a circuit pattern 220 which is formed on at least one surface of the first insulating 210; a lower clad 235 which is formed on the first insulating layer 210; a core 245 which is formed on the lower clad 235; an upper clad 255 which is formed on the core 245; and a second insulating layer which is formed on an upper surface and a lower surface of the first insulating layer 210, and buries the lower clad 235, the core 245 and the upper clad 255.

The optical waveguide is formed on the first insulating layer 210. More preferably, the lower clad 235, the core 245 and the upper clad 255 are sequentially formed on the first insulating layer 210.

The lower clad 235, the core 245 and the upper clad 255 are formed by sequentially laminating a sheet type material for the optical waveguide on the first insulating layer 210.

In the present invention, the lower clad 235, the core 245 and the upper clad 255 are sequentially formed by printing or coating the liquid resin for the optical waveguide on the first insulating layer 210, or bonding a sheet type material for the optical waveguide. Thus, the freedom of wiring designs can be improved, the process for forming the receiving space can be omitted, and precision can be improved.

In the third exemplary embodiment of the present invention, the upper clad 255 is formed to surround the side of the lower clad 235, and the side and the upper surface of the core 245.

That is, the upper clad 255 may be formed to surround the side of the core 245 and the side of the lower clad 235 by adjusting a position of the mask or exposure and development positions depending on the methods of forming the upper clad 255.

A reflecting plate for reflecting optical signals may be formed on one surface of the core 245. The reflecting plate is formed of a material having a high reflectivity such as aluminum or silver.

At this time, the core 245 is disposed in the inner part of the upper clad 255 and the lower clad 235, and has a high refractive index compared to the upper clad 255 and the lower clad 235. Thus, the light passing through the core 142 is totally reflected at a boundary surface between the core 245, and the upper clad 255 and the lower clad 235, thereby proceeding along the core 245.

The optical transmitter (not drawn) and the optical receiver (not drawn) are formed at the side of the lower clad 235, the core 245 and the upper clad 225.

That is, the optical transmitter (not drawn) is arranged with the one end of the core 245 so as to generate optical signals at one end of the core 245.

That is, the optical transmitter (not drawn) is arranged with another end of the core 245 so as to receive optical signals which are incident and transmitted to one end of the core 245.

In other words, since the side of the optical waveguide composed of the lower clad 235, the core 245 and the upper clad 255 has no structure (for example, a structure which have a constant inclined angle, and in which a reflective plate is formed) which may reflect light, the optical transmitter and the optical receiver are present on the same plane as the optical wave guide and generate or receive the optical signals.

In conclusion, the optical transmitter and the optical receiver are formed on the side of the optical waveguide, and the optical waveguide (clearly, the core) is located on an imaginary straight line which connects the optical transmitter and the optical receiver.

In the third exemplary embodiments of the present invention, since the optical waveguide is formed by printing or coating the liquid resin for the optical waveguide on the printed circuit board in which the inner side is formed, or attaching the sheet type material for the optical waveguide thereto, the freedom of wiring designs can be improved, the process of forming the receiving space for burying the optical waveguide can be shortened, and the precision of alignment can be improved.

FIG. 34 through FIG. 49 are views for explaining a method of manufacturing the optical printed circuit board as illustrated in FIG. 32 and FIG. 33 in order of processes. Hereinafter, a method of manufacturing a optical printed circuit board 200 according to the third exemplary embodiment will be explained using appropriately the perspective view and the cross-sectional view of the optical printed circuit board.

Figure 34:
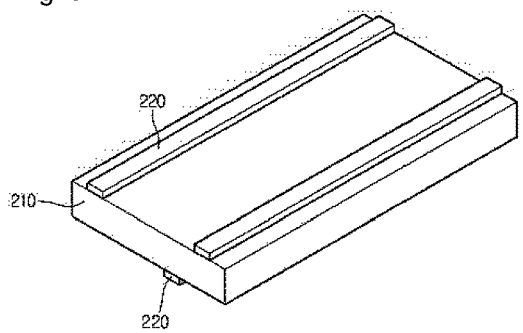
FIG. 34 through FIG. 49 are views for explaining a method of manufacturing the optical printed circuit board as illustrated in FIG. 32 and FIG. 33 in order of processes.
Figure 35:
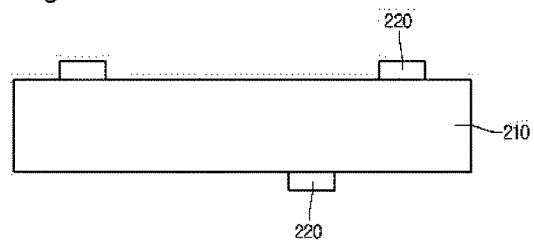

First, referring to FIG. 34 and FIG. 35, the insulating substrate 210 is prepared, the circuit pattern 225 is formed on at least one surface of the insulating layer 210. FIG. 34 is a perspective view of the optical printed circuit board for explaining the manufacturing processes and FIG. 35 is a cross-sectional view of FIG. 34.

Then, the circuit pattern 220 is formed by etching the conductive layer.

The circuit pattern 220 may be formed in the order of a dry film laminating film, an exposure process, a development process, and a peeling process.

Figure 36:
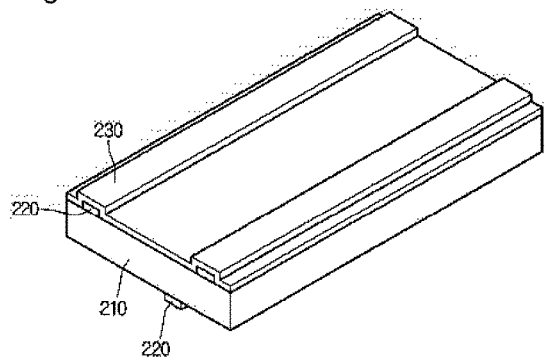
Figure 37:
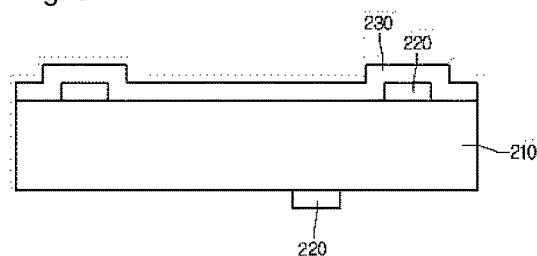

Next, as illustrated in FIG. 36 and FIG. 37, the first optical waveguide layer 230 is formed on the upper surface of the first insulating layer 210 on which the circuit pattern 220 is formed. FIG. 36 is a perspective view of the optical printed circuit board for explaining the manufacturing processes. FIG. 37 is a cross-sectional view of FIG. 36.

The first optical waveguide layer 230 is a basic layer for forming the lower clad 235 and is composed of the polymer-based material such as acryl, epoxy, polyimide, fluorinated acryl, or fluorinated polyimide as explained above.

At this time, as illustrated in FIG. 21, the first optical waveguide 230 may be formed by forming a mask 270 on the first insulating layer 210 on which the printed circuit pattern 220 is formed, and printing a liquid resin 280 for the optical waveguide thereon using a squeeze accordingly. Also, unlike this, as illustrated in FIG. 22, the first optical waveguide layer 230 may be formed by forming the mask 270 on the first insulating layer 210, and coating a liquid resin 280 for the optical waveguide using a spray 290 accordingly.

Figure 38:
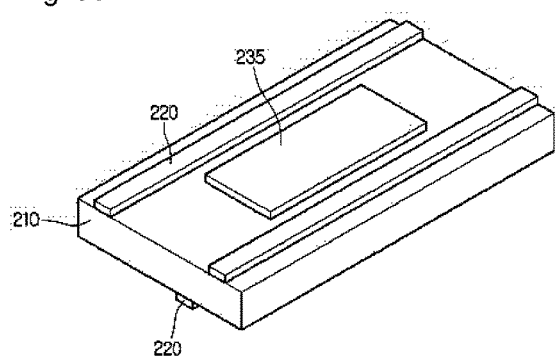
Figure 39:
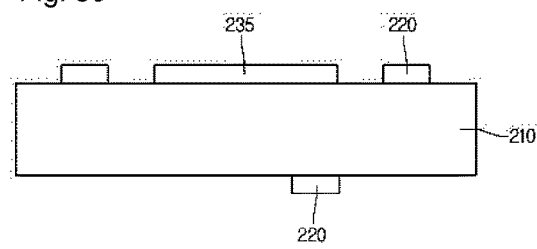

Next, as illustrated in FIG. 38 and FIG. 39, the lower clad 235 is formed by exposing and developing the first optical waveguide layer 230. FIG. 38 is a perspective view of the printed circuit board for explaining the manufacturing process, and FIG. 39 is a cross-sectional view of the FIG. 38.

Figure 40:
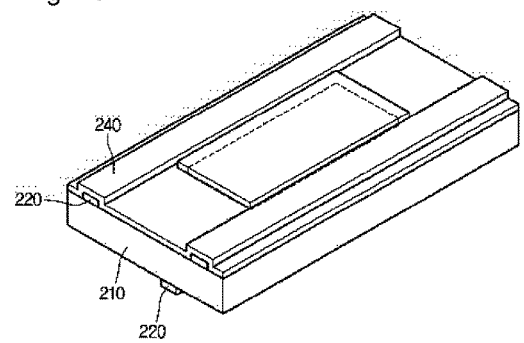
Figure 41:
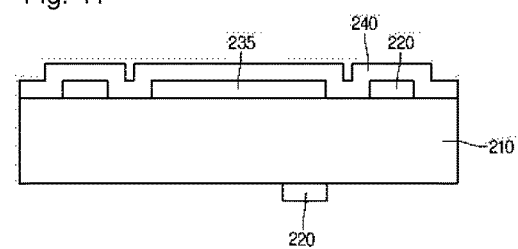

Next, as illustrated in FIG. 40 and FIG. 41, the second optical waveguide 240 is formed on the first insulating layer on which the lower clad 235 is formed.

FIG. 40 is a perspective view of the optical printed circuit board for explaining the manufacturing processes and FIG. 41 is a cross-sectional view of FIG. 40.

The second optical waveguide layer 240 is a basic layer for forming the core 245. As explained above, the second optical waveguide layer 240 is composed of a similar polymer-based material to that of the first optical waveguide layer 230, and has a higher refractive index than the first optical waveguide layer 230 to efficiently transmit the optical signals. At this time, the second optical waveguide layer 240 may be formed of SiO2 in which a silica or a polymer is mixed.

Figure 52:
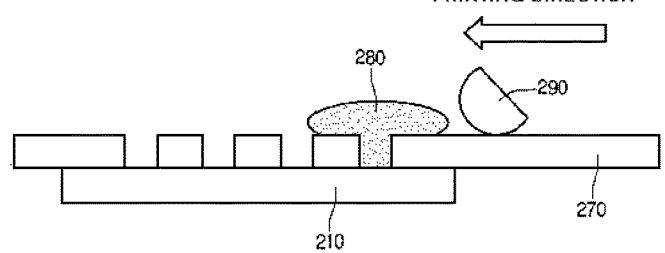
FIG. 52 and FIG. 53 are views for explaining the method of manufacturing the optical printed circuit board according to exemplary embodiments of the present invention more in detail.
Figure 53:
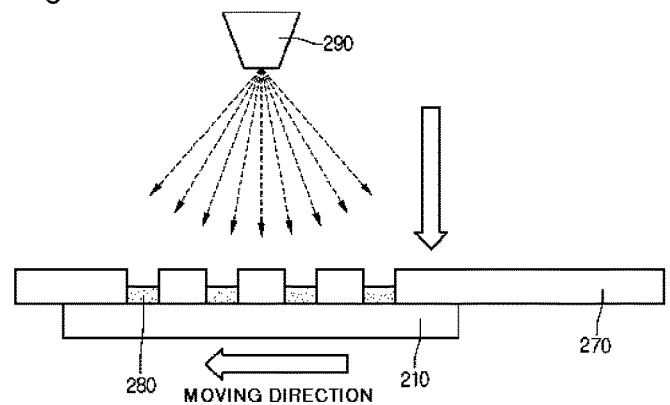

At this time, as illustrated in FIG. 52, the second optical waveguide 240 may be formed by forming a mask 270 on the first insulating layer 210 on which the lower clad 235 is formed and printing the liquid resin 280 for the optical waveguide thereon using a squeeze. Also, unlike this, as illustrated in FIG. 53, the second optical waveguide layer 240 may be formed by forming the mask 270 on the first insulating layer 210, and coating the liquid resin 280 for the optical waveguide thereon using a spray 290.

Figure 42:
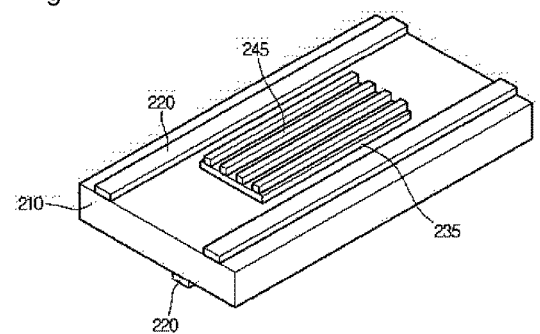
Figure 43:
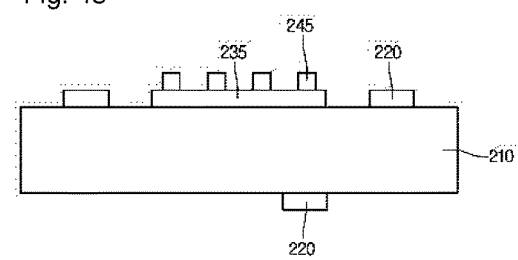

Next, as illustrated in FIG. 42 and FIG. 43, the core 245 is formed by exposing and developing the second optical waveguide layer 240. FIG. 42 is a perspective view of the optical printed circuit board for explaining the manufacturing processes, and FIG. 43 is a cross-sectional view of the FIG. 42.

Figure 44:
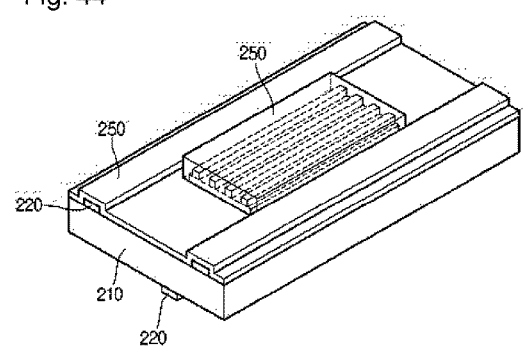
Figure 45:
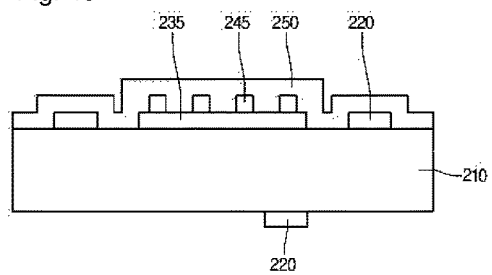

Next, as illustrated in FIG. 44 and FIG. 45, a third optical waveguide layer 250 is formed on the first insulating layer 210 on which the core 245 is formed. FIG. 44 is a perspective view of the optical printed circuit board for explaining the manufacturing process, and FIG. 45 is a cross-sectional view of the FIG. 44.

The third optical waveguide layer 250 is a basic layer for forming the upper clad 255 and is composed of the polymer-based material such as acryl, epoxy, polyimide, fluorinated acryl, or fluorinated polyimide as explained above.

At this time, as illustrated in FIG. 52, the third optical waveguide 250 may be formed by forming the mask 270 on the first insulating layer 210 on which the core 245 is formed, and printing the liquid resin 280 for the optical waveguide thereon using the squeeze 290. Also, unlike this, as illustrated in FIG. 53, the third optical waveguide layer 250 may be formed by forming the mask 270 on the first insulating layer 210, and coating the liquid resin 280 for the optical waveguide thereon using a spray 290.

Figure 46:
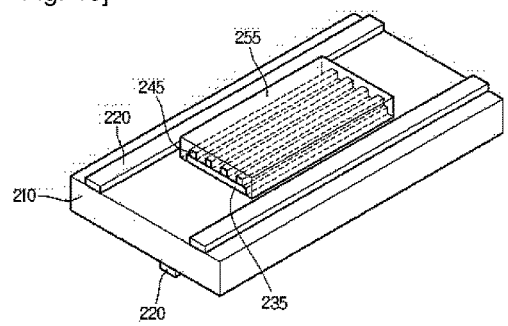
Figure 47:
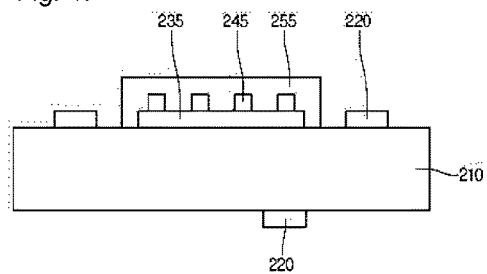

Next, as illustrated in FIG. 46 and FIG. 47, the upper clad 255 is formed by exposing and developing the third optical waveguide layer 250. FIG. 46 is a perspective view of the optical printed circuit board for explaining the manufacturing process, and FIG. 47 is a cross-sectional view of the FIG. 46.

At this time, the upper clad 255 is formed to surround the upper surface and the side of the core 245, and the side of the lower clad 235.

As described above, the core 245 is disposed in the inner part of the upper clad 255 and the lower clad 235, and has a high refractive index compared to the upper clad 255 and the lower clad 235. Thus, the light passing through the core 245 is totally reflected at a boundary surface between the core 245, and the upper clad 255 and lower clad 235, thereby proceeding along the core 245.

Figure 48:
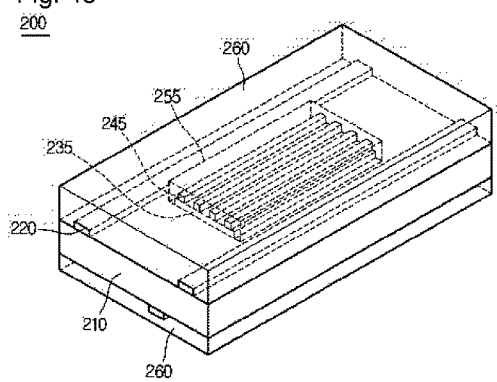
Figure 49:
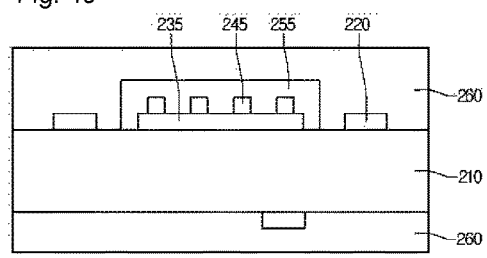

Next, as illustrated in FIG. 48 and FIG. 49, the second insulating layer for burying the optical waveguide and the circuit pattern 220 are formed on the upper surface and the lower surface of the insulating layer 210.

Prior to this, the optical transmitter (not drawn) and the optical receiver (not drawn) may be formed on both sides of the optical waveguide, respectively.

That is, the optical transmitter (not drawn) is arranged with one end of the core 245, thereby generating the optical signals to the one end of the core 245.

Also, the optical transmitter (not drawn) is arranged with another end of the core 245, thereby receiving the optical signals which are incident and transmitted to the one end of the core 245.

In other words, since the side of the optical waveguide composed of the lower clad 235, the core 245 and the upper clad 255 has no structure (for example, a structure which have a constant inclined angle, and in which a reflective plate is formed) which may reflect light, the optical transmitter and the optical receiver are present on the same plane as the optical wave guide and generate or receive the optical signals.

In conclusion, the optical transmitter and the optical receiver are formed on the side of the optical waveguide, and the optical waveguide (clearly, the core) is located on an imaginary straight line which connects the optical transmitter and the optical receiver.

Figure 50:
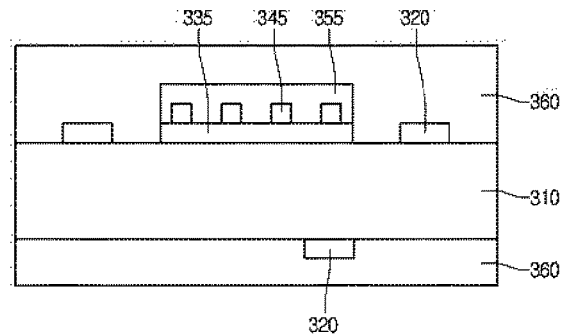
FIG. 50 is a perspective view of an optical printed circuit board according to a fourth exemplary embodiment of the present invention.

FIG. 50 is a cross-sectional view of an optical printed circuit board 300 according to a fourth exemplary embodiment of the present invention.

Referring to FIG. 50, the optical printed circuit board 300 according to the fourth exemplary embodiment of the present invention includes: a first insulating layer 310; a circuit pattern 320 which is formed on at least one surface of the first insulating 310; a lower clad 335 which is formed on the first insulating layer 310; a core 345 which is formed on the lower clad 335; an upper clad 355 which is formed on the core 345; and a second insulating layer 360 which is formed on an upper surface and a lower surface of the first insulating layer 310, and buries the lower clad 335, the core 345 and the upper clad 355.

The optical printed circuit board 300 according to the fourth exemplary embodiment is only different from the optical printed circuit board 200 according to the third exemplary embodiment with respect to only the shape of the optical waveguide, and their remaining structures are identical with each other.

That is, the optical printed circuit board 300 according to the fourth exemplary embodiment includes the lower clad 335, the core 345 and the upper clad 355. The upper clad 355 buries the upper surface and the side of the core 345, and is formed to expose the side of the lower clad 335.

Figure 51:
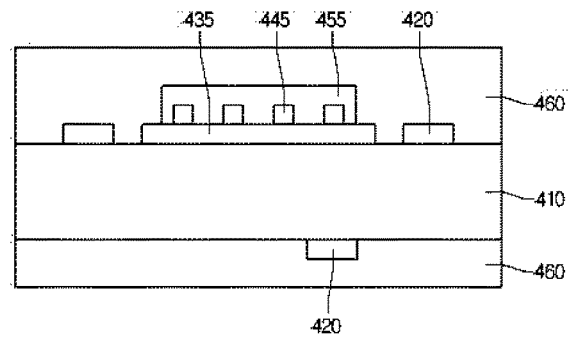
FIG. 51 is a perspective view of an optical printed circuit board according to a fifth exemplary embodiment of the present invention.

FIG. 51 is a cross-sectional view of an optical printed circuit board 400 according to a fifth exemplary embodiment of the present invention.

Referring to FIG. 51, the optical printed circuit board 400 according to the fifth exemplary embodiment of the present invention includes: a first insulating layer 410; a circuit pattern 420 which is formed on at least one surface of the first insulating 410; a lower clad 435 which is formed on the first insulating layer 410; a core 445 which is formed on the lower clad 435; an upper clad 455 which is formed on the core 445; and a second insulating layer 460 which is formed on an upper surface and a lower surface of the first insulating layer 410, and buries the lower clad 435, the core 445 and the upper clad 455.

The optical printed circuit board 400 according to the fifth exemplary embodiment is only different from the optical printed circuit board 300 according to the fourth exemplary embodiment with respect to only the shape of the optical waveguide, and their remaining structures are identical with each other.

That is, the optical printed circuit board 400 according to the fifth exemplary embodiment includes the lower clad 435, the core 445 and the upper clad 455. The upper clad 455 buries the upper surface and the side of the core 445, and is formed to expose a part of the upper surface of the lower clad 435 as well as the side of the lower clad 435. For this, the core 445 is formed to expose the part of the upper surface of the lower clad 435.

Thus, in the optical printed circuit board 400 according to the fifth exemplary embodiment, the lower clad 435, the core 445 and the upper clad 455 are formed in a stepped structure.

According to the exemplary embodiments of the present invention, since the optical waveguide is formed by printing or coating the liquid resin for the optical waveguide on the printed circuit board in which the inner side is formed, or attaching the sheet type material for the optical waveguide thereto, the freedom of wiring designs can be improved, the process of forming the receiving space for burying the optical waveguide can be shortened, and alignment precision can be improved.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

The invention claimed is:

1. An optical printed circuit board, comprising:
a first insulating layer on which at least one receiving groove with an inclined angle on at least one end is formed;
a first mirror disposed on a left side surface of the receiving groove;
a second mirror disposed on a right side surface of the receiving groove;
an optical waveguide which is formed in the receiving groove of the first insulating layer; and
a second insulating layer which is formed on the first insulating layer and buries the optical waveguide formed in the receiving groove,
wherein the optical waveguide comprises:
a lower clad;
a core on the lower clad; and
an upper clad on the core and covering a side surface and an upper surface of the core,
wherein the side surface of the core is separated from the first mirror and the second mirror,
wherein a side surface of the upper clad is directly contacted with the first mirror and the second mirror, and
wherein the upper clad covers a side surface of the lower clad.

2. The optical printed circuit board of claim 1, wherein the optical waveguide is formed so that a part thereof is protruded to an upper part of the receiving groove.

3. The optical printed circuit board of claim 1, wherein the receiving groove comprises: a lower surface; and the left side surface and the right side surface each has a constant inclined angle from a respective end of the lower surface and is formed to extend to an upper side, and the constant inclined angle is any one of 45° and 135°.

4. The optical printed circuit board of claim 1, wherein a circuit pattern is formed on at least one surface of the first insulating layer, an optical transmitter is electrically connected to the circuit pattern formed at an upper part of the first mirror, and an optical receiver is electrically connected to the circuit pattern formed at an upper part of the second mirror.

5. The optical printed circuit board of claim 4, wherein the optical transmitter and the optical receiver are buried in the second insulating layer.

6. An optical printed circuit board, comprising:
a first insulating layer on which at least one receiving grove with an inclined angle on at least one end is formed;
a first mirror disposed on a left side surface of the receiving groove;
a second mirror disposed on a right side surface of the receiving groove;
an optical waveguide which is formed on the first insulating layer; and
a second insulating layer which is formed on the first insulating layer, and buries the optical waveguide,
wherein the optical waveguide comprises:
a lower clad;
a core on the lower clad; and
an upper clad on the core and covering a side surface and an upper surface of the core,
wherein the side surface of the core is not contacted with the first mirror and the second mirror,
wherein a side surface of the upper clad is directly contacted with the first mirror and the second mirror,
wherein the upper clad covers a side surface of the lower clad, and
wherein a lowermost surface portion of the upper clad lies in the same plane as a lower surface of the lower clad.

7. The optical printed circuit board of claim 6, wherein the core is formed of a material having a higher refractive index than the upper clad and the lower clad.

8. The optical printed circuit board of claim 6, further comprising: an optical transmitter which is buried in the second insulating layer and is formed on a first side of the optical waveguide; and an optical receiver which is buried in the second insulating layer, and is formed on a second side of the optical waveguide.

9. A method of manufacturing an optical printed circuit board, comprising:
preparing an insulating substrate having a circuit pattern formed on at least one surface thereof;
processing the insulating substrate to form a receiving groove with an inclined angle on at least one end;
forming a first mirror and a second mirror on a left side surface and a right side surface of the receiving groove after the forming of the receiving groove; and
forming an optical waveguide in the receiving groove,
wherein the optical waveguide comprises:
a lower clad;
a core on the lower clad; and
an upper clad on the core and covering a side surface and an upper surface of the core,
wherein the side surface of the core is not contacted with the first mirror and the second mirror,
wherein a side surface of the upper clad is directly contacted with the first mirror and the second mirror,
wherein the upper clad covers a side surface of the lower clad, and
wherein a lowermost surface portion of the upper clad lies in the same plane as a lower surface of the lower clad.

10. The method of claim 9, wherein the forming of the receiving groove is performed by forming the receiving groove by applying a laser trench process or a precision and cutting process to an upper surface of the insulating substrate.

11. The method of claim 9, wherein the receiving groove comprises: a lower surface; and the left side surface and the right side surface each has a constant inclined angle from a respective end of the lower surface and is formed to extend to an upper side, and the constant inclined angle is any one of 45° and 135°.

12. The method of claim 9, further comprising:
forming an optical transmitter on the circuit pattern formed at an upper part of the first mirror;
forming an optical receiver on the circuit pattern formed at an upper part of the second mirror; and forming an insulating layer for burying the optical waveguide, the optical transmitter, and the optical receiver on the insulating substrate,
after the forming of the optical waveguide.

* * * * *